US010909875B2

(12) United States Patent
Nadeau Beaulieu et al.

(10) Patent No.: US 10,909,875 B2
(45) Date of Patent: Feb. 2, 2021

(54) METHOD AND SYSTEM FOR DETERMINING A RECIRCULATION EFFECT FROM AN OBSTACLE ON A MAIN ROTOR INDUCED VELOCITY OF A SIMULATED ROTORCRAFT

(71) Applicant: CAE INC., Saint-Laurent (CA)

(72) Inventors: Michel Nadeau Beaulieu, Saint-Laurent (CA); Jean Tardif, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 361 days.

(21) Appl. No.: 15/940,251

(22) Filed: Mar. 29, 2018

(65) Prior Publication Data

US 2019/0304326 A1    Oct. 3, 2019

(51) Int. Cl.
G09B 9/08    (2006.01)
G09B 9/46    (2006.01)
G09B 9/44    (2006.01)

(52) U.S. Cl.
CPC ............ G09B 9/46 (2013.01); G09B 9/085 (2013.01); G09B 9/44 (2013.01)

(58) Field of Classification Search
CPC ............ G09B 9/46; G09B 9/44; G09B 9/085
USPC ........................................ 703/2, 8
See application file for complete search history.

(56) References Cited

U.S. PATENT DOCUMENTS

| | | | |
|---|---|---|---|
| 5,616,031 A | 4/1997 | Logg | |
| 6,230,697 B1* | 5/2001 | Itoyama | F02D 9/04 123/568.21 |
| 9,489,858 B2 | 11/2016 | Mengotti et al. | |
| 9,898,933 B2 | 2/2018 | Pire | |
| 9,932,959 B2* | 4/2018 | Al-Shibl | F03D 1/04 |
| 2014/0292556 A1 | 10/2014 | Kreitmair-Steck et al. | |
| 2016/0351060 A1 | 12/2016 | Pire et al. | |

(Continued)

FOREIGN PATENT DOCUMENTS

EP    1462806    9/2004

OTHER PUBLICATIONS

Magee et al., "Toward energy-optimizing rotary wing MAV formations", 2013, American Control Conference, IEEE, pp. 25-30.*

(Continued)

*Primary Examiner* — Juan C Ochoa
(74) *Attorney, Agent, or Firm* — Fasken Martineau DuMoulin (57) ABSTRACT

A method for determining an effect of a simulated obstacle on a main rotor induced velocity of a simulated rotorcraft in a simulation, comprising: receiving an aircraft airspeed of the simulated rotorcraft and a height above ground for the simulated rotorcraft; generating a line of sight vector having a source position located on the simulated rotorcraft, a direction and a given length; determining a distance between the simulated obstacle and the simulated rotorcraft using the line of sight vector, the distance being at most equal to the given length of the line of sight vector; determining an induced airflow velocity using the distance between the simulated obstacle and the simulated rotorcraft, the aircraft airspeed and the height above ground, the induced airflow velocity being caused by a downwash recirculation flow generated by the simulated obstacle; and outputting the induced airflow velocity.

20 Claims, 5 Drawing Sheets

(56) References Cited

U.S. PATENT DOCUMENTS

2017/0243505 A1    8/2017  Dimock

OTHER PUBLICATIONS

Kaaria et al., "The virtual AirDyn: a simulation technique for evaluating the aerodynamic impact of ship superstructures on helicopter operations", 2013, The Aeronautical Journal 117.1198, pp. 1233-1248.*
"An investigation of coupling ship/rotor flowfield using steady and unsteady rotor methods" Engineering Applications of Computational Fluid Mechanics, vol. 11, No. 1, 417-434, https://doi.org/10.1080/19942060.2017.1308272, Yongjie Shi et al.
"Computational Investigation of Micro Helicopter Near-Wall Effect", 19th Australasian Fluid Mechanics Conference, Melbourne, Australia, Dec. 8-11, 2014, D. C. Robinson et al.
"Helicopter Wakes Models in the Presence of Ground Obstacles", GARTEUR TP-174, Antonio Filippone et al., Apr. 2012.
"Realistic training for extreme flight conditions", Technical University of Munich (TUM), Dec. 27, 2016.
"Real-Time Simulation of Rotor Inflow Using a Coupled Flight Dynamics and Fluid Dynamics Simulation", Deutscher Luft- und Raumfahrtkongress 2016, J. Bludau et al.

* cited by examiner

METHOD AND SYSTEM FOR DETERMINING A RECIRCULATION EFFECT FROM AN OBSTACLE ON A MAIN ROTOR INDUCED VELOCITY OF A SIMULATED ROTORCRAFT

TECHNICAL FIELD

The present invention relates to the field of rotorcraft simulators, and more particularly to the determination the recirculation effects from nearby obstruction(s) on the main rotor induced velocity of a simulated helicopter.

BACKGROUND

The safe and efficient flight operation of modern helicopters has many demanding aspects for the crew and requires an extensive amount of training. This training on the actual aircraft can be costly and time consuming and involves a certain degree of risks. Flight simulators have been developed to alleviate some of these constraints and their level of fidelity has consistently improved over the years. In a typical training scenario, pilots who fly simulators can observe obstacles in the scene through a visual system. The latter is built based on databases that contain the topography of the terrain and physical structures such as buildings, walls, trees, bridges, etc. One challenge of creating a complete simulation is the interaction of the simulated aircraft with its simulated environment represented through the visual system and the weather selected by the instructor (winds, turbulence, etc.). It is possible to have the weather interact with the visual system and the typical method used is to generate a series of computational fluid dynamics (CFD) solutions that pre-calculate the flow and turbulence fields around the various structures contained in the visual database.

Figure 1:
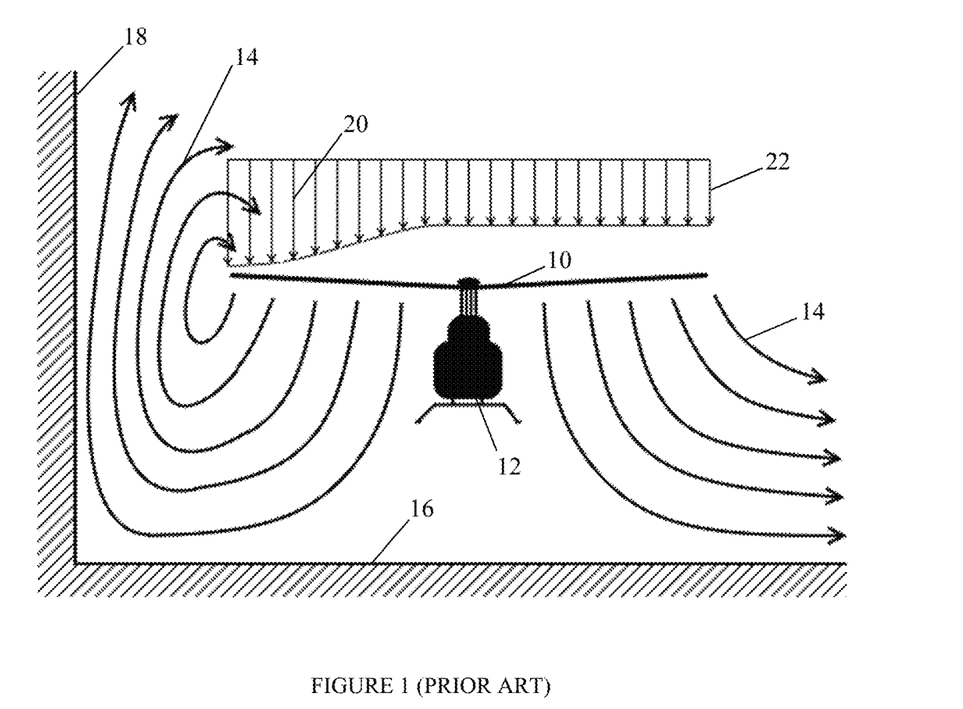
FIG. 1 illustrates a recirculation of the downwash caused by a main rotor of a helicopter near an obstruction or obstacle, in accordance with the prior art.

Although they may generate precise solutions, CFD methods are costly and usually do not take into account the effects of the helicopter itself on the flow fields. For instance and as illustrated in FIG. 1, the helicopter main rotor downwash that consists of a downward airflow that can interact with the ground and surrounding obstructions as illustrated in FIG. 1. As illustrated in FIG. 1, the main rotor 10 of a helicopter 12 generates a downward airflow 14 which can be reflected by the ground 16 and a vertical structure 18 so as to be re-ingested by the main rotor 10. This interaction causes a recirculation of the main rotor downwash that can increase the amount of downwash 20 on the side of the vertical structure in comparison to the downwash 22 on the opposite side of the rotor. The main rotor recirculation leads the following adverse effects: a reduction of the overall helicopter performances and un-commanded changes in the helicopter pitch and bank angles, which result in the helicopter being momentarily attracted by the vertical structure until the pilot takes corrective actions.

The recirculation effects caused by the helicopter interactions with nearby structures cannot be captured in static CFD solutions because of the dynamic nature of the phenomenon, and of the infinite amount of possible helicopter positions, heading, height above ground, main rotor thrust, etc. However, simulating such recirculation effects may be important to provide a realistic training.

Therefore, there is a need for an improved method and system for determining an airflow velocity at a main rotor of a simulated helicopter in a simulation.

SUMMARY

According to a first broad aspect, there is provided a computer-implemented method for determining an effect of a simulated obstacle on a main rotor induced velocity of a simulated rotorcraft in a simulation, comprising: receiving an aircraft airspeed of the simulated rotorcraft and a height above ground for the simulated rotorcraft; generating a line of sight vector having a source position located on the simulated rotorcraft, a direction and a given length; determining a distance between the simulated obstacle and the simulated rotorcraft using the line of sight vector, the distance being at most equal to the given length of the line of sight vector; determining a recirculation induced airflow velocity using the distance between the simulated obstacle and the simulated rotorcraft, the aircraft airspeed and the height above ground, the recirculation induced airflow velocity being caused by a downwash recirculation flow generated by the simulated obstacle; and outputting the recirculation induced airflow velocity.

In one embodiment, the direction of the line of sight vector corresponds to an azimuth angle.

In one embodiment, the line of sight vector is parallel to an Earth horizontal plane.

In one embodiment, the source position is located along the rotation axis of the main rotor of the simulated rotorcraft.

In one embodiment, the source position is located on a hub of the main rotor of the simulated rotorcraft.

In one embodiment, the method further comprises varying the azimuth angle of the line of sight vector.

In one embodiment, the method further comprises varying a position of the source position along a rotation axis of the main rotor of the simulated rotorcraft.

In one embodiment, said generating the line of sight vector comprises generating a plurality of line of sight vectors each having a respective source position located on the simulated rotorcraft, a respective azimuth angle and a respective length.

In one embodiment, said determining the distance between the simulated obstacle and the simulated rotorcraft comprising determining a respective distance between each respective source position and the simulated obstacle.

In one embodiment, the respective length is identical for each one of the plurality of line of sight vectors.

In one embodiment, the respective source position is located along a rotation axis of the main rotor of the simulated rotorcraft.

In one embodiment, the respective source position is located along a rotation axis of the main rotor of the simulated rotorcraft.

In one embodiment, at least two of the plurality of line of sight vectors have a same source position and a different azimuth angle.

In one embodiment, at least two of the plurality of line of sight vectors have a different source position and a same azimuth angle.

In one embodiment, said determining the distance between the simulated obstacle and the simulated rotorcraft comprises: accessing a visual database containing a topography of a simulated terrain and simulated physical structures; identifying the simulated obstacle as being the closest object from the source position along a direction defined by the azimuth angle, the closest object being one of a part of the simulated terrain and one of the simulated physical structures and a distance between the closest object and the source position being at most equal to the given length of the line of sight vector; and determining a distance between the source position and the closest object, thereby obtaining the distance between the simulated obstacle and the simulated rotorcraft.

According to a second broad aspect, there is provided a system for determining an effect of a simulated obstacle on a main rotor induced velocity of a simulated rotorcraft in a simulation, comprising: a communication unit for at least one of receiving and transmitting data, a memory and a processing unit configured for executing the steps of the above method.

According to a further broad aspect, there is provided a system for determining an effect of a simulated obstacle on a main rotor induced velocity of a simulated rotorcraft in a simulation, comprising: a vector module configured for generating a line of sight vector having a source position located on the simulated rotorcraft, an azimuth angle and a given length; a calculation module configured for: receiving a distance between the simulated obstacle and the simulated rotorcraft, an aircraft airspeed of the simulated rotorcraft and a height above ground for the simulated rotorcraft; determining a recirculation induced airflow velocity using the distance between the simulated obstacle and the simulated rotorcraft, the aircraft airspeed, the height above ground and the distance between the simulated obstacle and the simulated rotorcraft, the recirculation induced airflow velocity being caused by a downwash recirculation flow generated by the simulated obstacle and the distance being at most equal to the given length of the line of sight vector; and outputting the recirculation induced airflow velocity.

In one embodiment, the direction of the line of sight vector corresponds to an azimuth angle.

In one embodiment, the system further comprising a distance module configured for determining the distance between the simulated obstacle and the simulated rotorcraft using the line of sight vector.

In one embodiment, the line of sight vector is parallel to an Earth horizontal plane.

In one embodiment, the source position is located along the rotation axis of the main rotor of the simulated rotorcraft.

In one embodiment, the vector module is further configured for varying the azimuth angle of the line of sight vector.

In one embodiment, the vector module is further configured for varying a position of the source position along a rotation axis of the main rotor of the simulated rotorcraft.

In one embodiment, the vector module is configured for generating a plurality of line of sight vectors each having a respective source position located on the simulated rotorcraft, a respective azimuth angle and a respective length.

In one embodiment, the distance between the simulated obstacle and the simulated rotorcraft comprising a respective distance between each respective source position and the simulated obstacle.

In one embodiment, the respective length is identical for each one of the plurality of line of sight vectors.

In one embodiment, the respective source position is located along a rotation axis of the main rotor of the simulated rotorcraft.

In one embodiment, the respective source position is located along a rotation axis of the main rotor of the simulated rotorcraft.

In one embodiment, at least two of the plurality of line of sight vectors have a same source position and a different azimuth angle.

In one embodiment, at least two of the plurality of line of sight vectors have a different source position and a same azimuth angle.

In one embodiment, the distance module is configured for: accessing a visual database containing a topography of a simulated terrain and simulated physical structures; identifying the simulated obstacle as being the closest object from the source position along a direction defined by the azimuth angle, the closest object being one of a part of the simulated terrain and one of the simulated physical structures and a distance between the closest object and the source position being at most equal to the given length of the line of sight vector; and determining a distance between the source position and the closest object, thereby obtaining the distance between the simulated obstacle and the simulated rotorcraft.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 2:
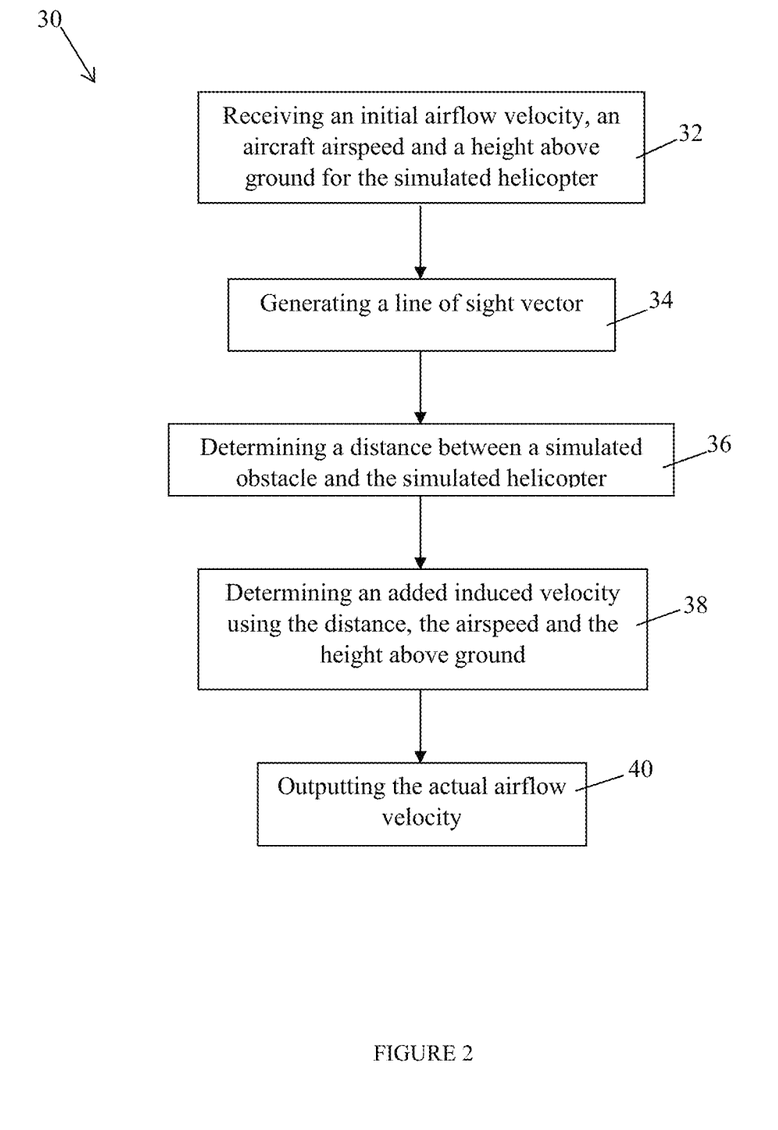
FIG. 2 is a flow chart of a method for determining an airflow velocity at a main rotor of a simulated helicopter, in accordance with an embodiment.

FIG. 2 illustrates a computer implemented method 30 for determining an effect of a simulated obstacle on a main rotor induced velocity of a simulated helicopter, i.e. determining a recirculation induced airflow velocity at a main rotor of a simulated helicopter caused by an obstruction or obstacle. The method 30 is performed by a computer machine provided with communication means, a processing unit and a memory.

The simulation is configured for training a user to use a helicopter. Images of an outdoor are displayed on a display and the displayed images may correspond to what would be seen by the user if he would be within a real helicopter.

The simulator used for providing the simulation to the user comprises at least a display on which the simulated images are to be displayed, instruments for allowing the user to control the simulated helicopter and a simulation engine configured for generating the simulation using the commands received from the instruments and displaying the generated simulation images on the display. The simulator further comprises a database having stored thereon at least topography information about the simulated terrain and simulated structures such as buildings, walls, trees, bridges, and moving entities such as landable ships, and/or the like. For example, the database may contain information such as the position information, dimension information, information about the material from which a structure is made, and/or the like.

At step 32, information about the simulated helicopter is received. The information comprises the initial airflow velocity at the main rotor of the simulated helicopter, the aircraft airspeed of the simulated helicopter and the height above ground for the simulated helicopter. In one embodiment, the information about the simulated helicopter is sent by the simulation engine and this information may be stored in the database along with other information such as the topography information. In one embodiment, the method 30 may further comprise a step of sending a request for information about the simulated helicopter to the simulation engine. In this case, the simulation engine transmits the information about the simulated helicopter upon receipt of the request.

At step 34, a line of sight vector is generated. A line of sight vector is defined by a source position, a direction and a length. The length of the line of sight vector defines a maximum range for the identification of obstacles, i.e. only obstacles of which the distance from the source position will be identified and trigger the execution of steps 36 to 40 of the method 30. Any obstacle positioned at a distance greater than the length of the line of sight vector will be ignored and will not affect the airflow velocity at the main rotor of the simulated helicopter. On the other end, any obstacle positioned at a distance equal to or shorter than the length of the line of sight vector will be considered to have an impact on the airflow velocity at the main rotor of the simulated helicopter. As a result, steps 36 to 40 of the method 30 are to be executed.

In one embodiment, the direction may be expressed as an azimuth angle. In this case, the azimuth angle represents the angular direction of the line of sight vector within the azimuth plane of the simulated helicopter or the angular direction of the projection of the line of sight vector in the azimuth plane when the line of sight vector is not contained in the azimuth plane of the simulated helicopter. The source position of the line of sight vector may be located at different locations as explained in the following.

In one embodiment, the source position of the line of sight vector may be located on the simulated helicopter. In another embodiment, the source position may be adjacent to the simulated helicopter.

In one embodiment, the source position of the line of sight vector is located along an axis which is orthogonal to the azimuth plane of the simulated helicopter. For example, the source position of the line of sight vector may be located on the rotation axis of the main rotor of the simulated helicopter.

In one embodiment, the line of sight vector is orthogonal to the rotation axis of the main rotor of the simulated helicopter. In this case, the line of sight vector is either contained in the azimuth plane of the simulated helicopter or parallel to the azimuth plane. In one embodiment, the source position of the line of sight vector is located on the rotation axis of the main rotor of the simulated helicopter in addition to being orthogonal to the rotation axis. In one embodiment, the source position is located on the hub of the main rotor of the simulated helicopter.

In one embodiment, the line of sight vector is parallel to the Earth horizontal plane.

At step 36, it is determined whether an obstacle is present along the direction of the line of sight vector while being within the maximum range defined by the length of the line of sight vector. To do so, the distance between the source position and the closest obstacle from the source position along the direction of the line of sight vector is calculated using the topography information contained in the database.

If no obstacle is present, i.e. if the distance between the closest obstacle from the source position is greater than the length of the line of sight vector, then no recirculation induced airflow velocity is calculated. On the other end, if the presence of an obstacle is detected, i.e. if the distance between the closest obstacle from the source position is less than or equal to the length of the line of sight vector, then a recirculation induced airflow velocity is to be calculated and steps 38 to 40 are performed.

It should be understood that an obstacle may correspond to a part of the simulated terrain stored in the database such as a hill and/or a simulated structure such as a building.

It should also be understood that if more than one obstacle is identified as having a position within the maximum range defined by the length of the line of sight vector along the direction of the line of sight vector, only the obstacle being the closest form the source position is considered and the distance determined at step 36 then corresponds to the distance between the source position and the closest obstacle from the source position.

At step 38, a recirculation induced airflow velocity at the main rotor of the simulated helicopter is calculated using the distance between the simulated obstacle and the simulated helicopter determined at step 36, the airspeed of the simulated helicopter and the height above ground of the helicopter. In one embodiment, the shortest the distance between the source position and the closest obstacle is, the greater the recirculation effect on the recirculation induced airflow velocity is.

In one embodiment, the method 30 further comprises a step of comparing the airspeed of the simulated helicopter to an airspeed threshold and performing steps 36-40 only when the received airspeed of the simulated helicopter is less than the airspeed threshold.

In the same or another embodiment, the method 30 further comprises a step of comparing the height above ground received at step 32 to a height threshold and performing steps 36-40 only when the received height above ground is less than the height threshold.

Finally, the recirculation induced airflow velocity at the main rotor of the simulated helicopter is outputted at step 40. In one embodiment, the recirculation induced airflow velocity at the main rotor is stored in memory. In the same or another embodiment, the recirculation induced airflow velocity at the main rotor is sent to the simulation engine which uses the recirculation induced airflow velocity at the main rotor to calculate an actual airflow velocity at the main rotor which is used for controlling the simulated helicopter.

The actual airflow velocity at the main rotor of the simulated helicopter is calculated using the initial airflow velocity at the main rotor and the recirculation induced airflow velocity at the main rotor calculated at step 38. In one embodiment, the actual airflow velocity at the main rotor of the simulated helicopter is obtained by adding the calculated recirculation induced airflow velocity at the main rotor to the initial airflow velocity at the main rotor.

In one embodiment, the method 30 is executed in substantially real-time while the user interacts with the simulator to provide the user with a real-time effect of the presence of an obstacle on the simulated helicopter.

In one embodiment, the step 36 comprises sending to the simulation engine a request for receiving the distance of the closest obstacle from the source position of the line of sight vector. In this case, the request comprises at least the source position and the direction of the line of sight vector such as the azimuth angle associated with the line of sight vector. The simulation engine receives the request and determines the distance of the closest obstacle from the source position along the direction of the line of sight vector. In one embodiment, the simulation engine transmits the determined distance to the computer machine that executes the method 30 and the computer machine compares the received distance to the length of the line of sight vector. If the distance is greater than the length of the line of sight vector, the computer machine determines that the execution of the method 30 should be stopped and calculates no induced airspeed velocity. However, if the received distance is less than or equal to the length of the line of sight vector, the computer machine performs the steps 38-40 of the method 30 using the received distance. In an embodiment in which the request further comprises the length of the line of sight vector, the simulation engine may be further configured for comparing the determined distance to the length of the line of sight vector and transmits the determined distance to the computer machine only when it is less than or equal to the length of the line of sight vector.

In one embodiment, the method 30 further comprises iteratively varying the direction of the line of sight vector. It should be understood that the direction of the line of sight vector may iteratively take a plurality of different values. When the direction of the line of sight vector is represented by an azimuth angle, the value of the azimuth angle is changed. In this case, for each direction, the closest obstacle is identified and the distance to the closest obstacle is determined for each direction at step 36. A recirculation induced airflow velocity component is determined for each direction at step 38 using the respective distance to the closest obstacle. The actual airflow velocity is then calculated using the recirculation induced airflow velocity calculated for each direction.

In an embodiment in which the direction of the line of sight vector is represented by an azimuth angle, the value of the azimuth angle may be iteratively changed to cover 360 degrees so that any obstacle present around the simulated may be detected independently of the particular location of the obstacle. For example, the value of the azimuth angle may be iteratively varied by 10 degrees from 0 degree to 360 degrees In one embodiment, the method 30 further comprises varying the source position of the line of sight vector and performing the steps 36-40 for each possible source position for the line of sight vector. It should be understood that the variation of the source position may be combined with the above-described variation of the direction of the line of sight vector. For example, the direction of the line of sight may be varied for a same first source position for the line of sight vector, then the source position of the line of sight vector may be changed from the first source position to a second and different source position and the direction of the line of sight is then varied again.

In one embodiment, the different source positions for the line of sight vector may be chosen to be on the simulated helicopter. In another embodiment, only some of the different source positions may be chosen to be on the simulated helicopter. For example, some of the source positions may be located on the simulated helicopter while other source positions may be located between the simulated helicopter and the ground.

In one embodiment, the different source positions are located along an axis which is chosen to be orthogonal to the azimuth plane of the simulated helicopter. For example, the different source positions may be located on the rotation axis of the main rotor of the simulated helicopter.

Figure 3:
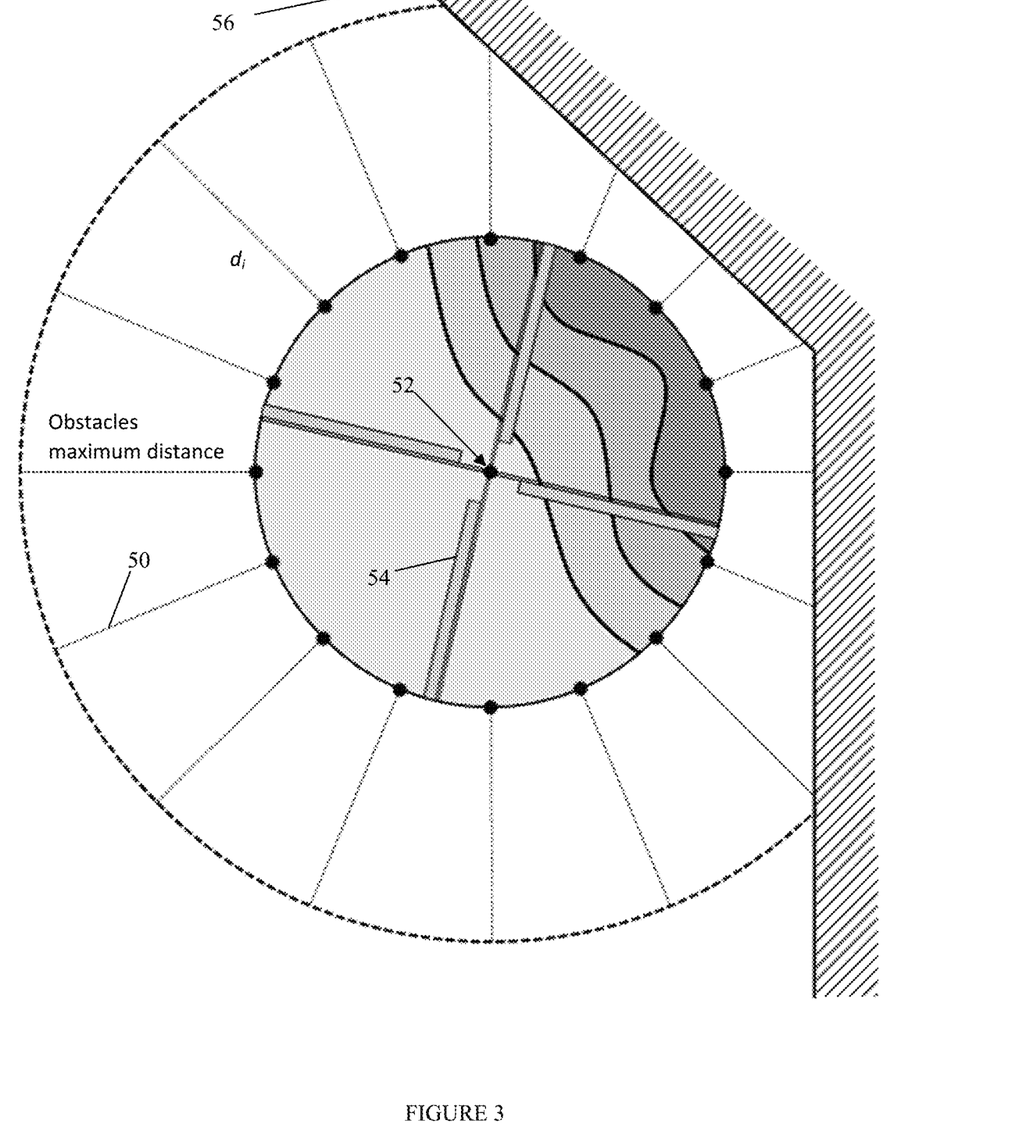
FIG. 3 illustrates the distribution of line of sight vectors within a same azimuth plane when a simulated helicopter is adjacent to an obstacle, in accordance with an embodiment.

FIG. 3 illustrates an embodiment in which a line of sight vectors may take 16 different azimuth angle values. A single line of sight vector 50 and the source position 52 of the line of sight vector 50 is constant and does not vary. In the illustrated example, the source position 52 of the line of sight vector 50 is positioned on the rotation axis of the main rotor 54 of a simulated helicopter. The azimuth angle of the line of sight vector 50 is changed to iteratively take one of the 16 possible values and for each azimuth angle value, the distance to the closest obstacle is determined. For example, the value of the azimuth angle may be changed at each simulation step. The distance to the closest obstacle for each azimuth angle value is then used for calculating the recirculation induced airflow velocity and the actual airflow velocity as described below.

In the illustrated example, the line of sight vector is able to detect the presence of an angled wall 56 when it occupies the 7 right-most possible positions.

While in the above description, there is described that a single line of sight vector is generated at step 34, it should be understood that a plurality of line of sight vectors may be generated at step 34. In this case, the plurality of line of sight vectors may have a same source position and/or a respective and different direction such as a different azimuth angle. In this case, for each line of sight vector, the respective distance from the closest obstacle is determined at step 36 and the recirculation induced airflow velocity is determined at step 38. At step 20, the actual airflow velocity is determined for direction using the initial airflow velocity and the recirculation induced airflow velocity.

In an embodiment in which a line of sight vector may iteratively occupy several source positions each positioned along an axis orthogonal to the azimuth plane of the simulated helicopter or the source position of a plurality of line of sight vectors is positioned along an axis orthogonal to the azimuth plane of the simulated helicopter, the distances to the closest obstacle obtained for a same given direction but different source positions may be averaged to provide a single distance which is then used in the calculation of the recirculation induced airflow for the given direction.

Referring back to FIG. 3, 16 line of sight vectors 50 may be concurrently generated at step 34. The adjacent line of sight vectors 50 are then spaced apart by an angle of 12.5 degrees. The distance between the closest obstacle and the source position 52 is concurrently determined for each one of the 16 line of sight vectors 50. The recirculation induced airflow velocity and the actual airflow velocity are each concurrently determined for the 7 right-most line of sight vectors 50 since the nine other line of sight vectors detected no obstacle.

Figure 4:
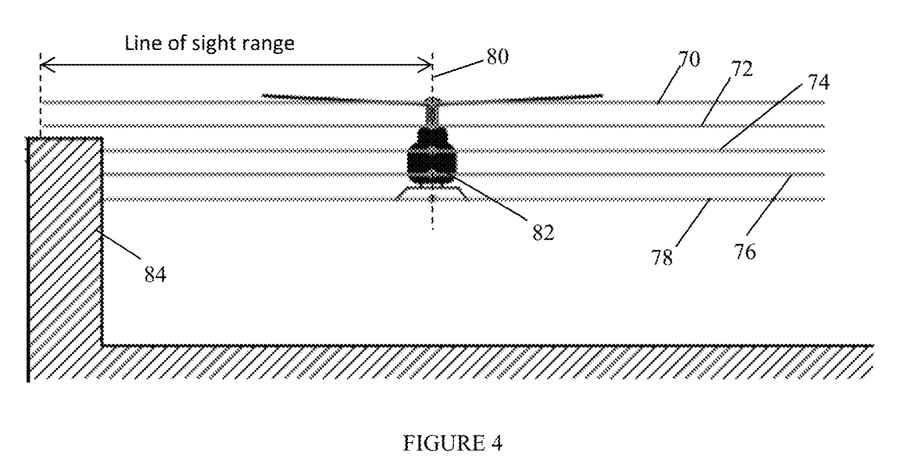
FIG. 4 illustrates the distribution of line of sight vectors within five parallel planes to the Earth horizontal plane when the simulated helicopter is adjacent to an obstacle, in accordance with an embodiment.

While in FIG. 3 the different line of sight vectors 50 are located within a same plane, FIG. 4 illustrates an embodiment in which the line of sight vectors are located within five different parallel planes 70-78 which are each orthogonal to the rotation axis 80 of the main rotor of a simulated helicopter 82. Each plane 70-78 may comprise a single line of sight vector having its source position on the rotation axis 80 and of which the azimuth angle is iteratively varied to cover a circumference of 360 degrees. In another example, each plane may each comprise a plurality of line of sight vectors having different azimuth angles. In one embodiment, the line of sight vectors may be aligned form one plane 70-78 to another. In this case, for a given line of sight vector belonging to a given plane 70-78 and having a given azimuth angle corresponds a line of sight vector having the same given azimuth angle and belonging to another plane 70-78. In this case, the distances to the closest obstacle obtained for the line of sight vectors sharing the same azimuth angle and belonging to different planes 70-78 may be averaged to obtain an average distance which is subsequently used for determining the recirculation induced airflow velocity for the given azimuth angle.

In the illustrated embodiment, the line of sight belonging to the three bottom-most planes 74-78 allows detecting the obstacle 84 while the line of sight vectors belonging to the planes 70 and 72 detect no obstacle.

In the following, there is described one exemplary method for calculating the actual airflow velocity when a plurality of line of sight vectors are generated each having a respective azimuth angle i. For each azimuth angle i, the respective recirculation induced airflow velocity $w_i$ at the rotor is defined by the following equation:

$$w_i = K_{Instructor} \cdot f_{Height} \cdot f_{AirSpeed} \cdot (K_{Local} \cdot f(d_i) + K_{Average} \cdot \overline{f(d_i)}) \cdot V_{Induced}$$

where:

$d_i$ is the local distance between the main rotor disk extremity and the nearest obstacle detected along the azimuth angle i. and is obtained from the diameter or radius of the main rotor and the distance between the source position and the nearest obstacle determined at step 34;

$f_{Height}$ is a function of height above ground, as defined below;

$f_{Airspeed}$ is a function of the aircraft airspeed, as defined below;

$f(d_i)$ is a function of the local distance $d_i$, as defined below;

$\overline{f(d_i)}$ is the average of $f(d_i)$ for all the azimuth angles i;

$K_{Instructor}$ is a slider gain that may be adjusted by a flight instructor during a training session;

$K_{Local}$ is a tuning gain used to adjust the effect of the recirculation at an azimuth angle i;

$K_{Average}$ is a tuning gain used to adjust the induced velocity effect on the whole main rotor; and $V_{Induced}$ is the main rotor induced average velocity (downwash) under the helicopter calculated by the simulation engine.

In one embodiment, the height function $f_{Height}$ is a tuning function that fades out the recirculation effect when the helicopter is out of ground effect. The height function may be defined as follows:

$$f_{Height} = \min\left(\max\left(\frac{H_{OGE} - h}{H_{OGE} - H_{IGE}}, 0.0\right), 1.0\right)$$

where h is the height of the main rotor above the ground and $H_{IGE}$ and $H_{OGE}$ are the parameterizable limit points in and out of ground effect for the application of the recirculation effects.

The airspeed function $f_{Airspeed}$ is defined as follows:

$$f_{Airspeed} = \min\left(\max\left(\frac{V_{Max} - V_{Airspeed}}{V_{Max} - V_{Min}}, 0.0\right), 1.0\right)$$

where $V_{Airspeed}$ is the helicopter airspeed (including the wind component) tangential to the ground, $V_{Min}$ is the minimum airspeed from which full recirculation effect is present and $V_{Max}$ is the maximum airspeed where no recirculation effect is present.

The local distance function $f(d_i)$ is defined as follows:

$$f(d_i) = \min\left(\max\left(\frac{D_{Max} - d_i}{D_{Max} - D_{Min}}, 0.0\right), 1.0\right)$$

where $D_{Min}$ is the minimum distance for full recirculation effect and $D_{Max}$ is the maximum distance where no recirculation will occur. Tuning the gain $K_{Local}$ on this function affects the local effect of the obstruction at the main rotor grid point corresponding to the azimuth angle i, resulting in un-commanded pitch and roll effects on the helicopter.

The function $\overline{f(d_i)}$ is defined as follows:

$$\overline{f(d_i)} = \Sigma_{i=1}^{i=n} f(d_i)/n$$

The airflow velocity induced by the recirculation may be seen as a gain on the initial airflow velocity produced by the main rotor disk $V_{induced}$. Since this recirculation induced airflow velocity is a function of the helicopter main rotor downwash intensity (resulting from its thrust), it can be understood that the recirculation has no effect when the helicopter is on the ground with no thrust and that a larger effect occurs as the power is increased and the helicopter takes off near an obstruction.

Once the recirculation effects have been calculated at the extremities of the main rotor disk, they can be interpolated at the main rotor blade elements (along the radius of the main rotor and to the current azimuthal angle of each actual main rotor blades) or in the center of the main rotor. This recirculation is then added to the vertical velocity component of airflow induced by the main rotor at each blade element k as it is shown in equation 7:

$$V_{InducedTotal,k} = V_{Induced,k} + w_k$$

Where:

$V_{InducedTotal,k}$=Vertical airflow velocity at the main rotor blade element k including the recirculation $V_{Induced,k}$=Vertical airflow velocity at the main rotor blade element k without the recirculation $w_k$=Recirculation velocity at blade element k, after interpolating the values at the relevant azimuth at the main rotor disk to the blade elements.

As a result of the added recirculation induced airflow velocity at the blade elements, the main rotor effectiveness is reduced, which adversely affects the helicopter performance. Local effects can also create a moment on the main rotor that will affect the helicopter roll and pitch attitudes.

In one embodiment, the actual forces and moments resulting from the aerodynamic effect applied on the rotor disk may have a time delay. Since the main rotor is turning at a high rate, this time delay results in an azimuthal shift of the force being applied on the rotor disk. This azimuth difference is called a phase angle. In one embodiment, a provision to adjust the phase angles based on the pilot's feedback can be added by offsetting the azimuths of the recirculation induced airflow velocity solution. With this tuning parameter, the pitch and roll behaviour of the aircraft can be adjusted when it is hovering near an obstruction.

It should be understood that other models may be used for calculating the recirculation induced velocity at the main rotor using the distance to the closest obstacle.

It should be understood that the method 30 may be embodied as a computer machine comprising at least one processing unit or processor, a communication unit and a memory having stored thereon statements and/or instructions that, when executed by the processing unit, executes the steps of the above-described method.

Figure 5:
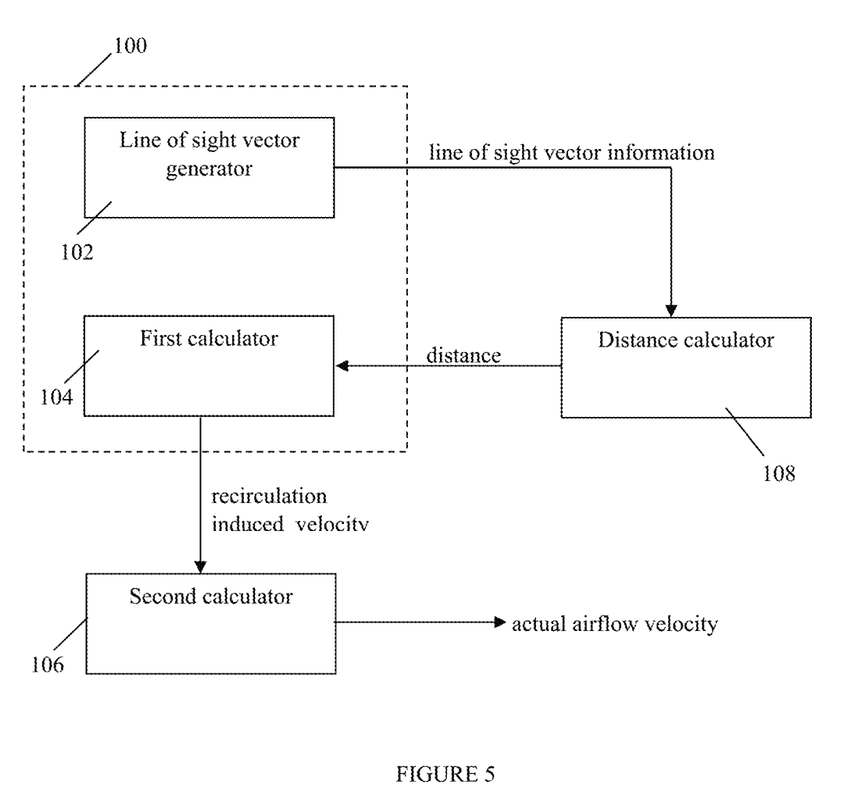
FIG. 5 is a block diagram of a system for determining an airflow velocity at a main rotor of a simulated helicopter, in accordance with an embodiment.

FIG. 5 illustrates one embodiment of a system 100 for calculating the recirculation induced velocity at the main rotor of a simulated helicopter. The system 100 comprises a line of sight vector generator 102 and a first or induced airflow velocity calculator 104 which is in communication with second or actual airflow velocity calculator 106.

The line of sight vector generator 102 is configured for generating at least one line of sight vector as described above. In one embodiment, the line of sight vector generator 102 is configured for generating a single line of sight vector and varying the source position and/or the direction of the single line of sight vector, as described above. In another embodiment, the line of sight vector generator 102 is configured for generating a plurality of line of sight vectors each having a different direction and/or a different source position, as described above.

The line of sight vector generator 102 is further configured for transmitting information about the generated line of sight vector to a distance calculator 108. The transmitted information contains at least the source position and the direction of the line of sight vector, for each generated line of sight vector. The distance calculator 108 is configured for calculating the distance between the source position and the closest obstacle along the direction and transmitting the calculated distance to the first calculator 104, for each line of sight vector, as described above.

In one embodiment, the line of sight vector generator 102 may further transmit the length of the line of sight vector to the distance calculator 108. In this case, the distance calculator 108 may be configured for comparing the determined distance to the length of the line of sight vector and transmit the determined distance to the attenuation gain calculator only when the determined distance is less than or equal to the length of the line of sight vector. It should be understood that, if it receives no distance from the distance calculator 108, then the first calculator 104 calculates no recirculation induced airflow velocity.

In another embodiment, the line of sight vector generator 102 may further be configured for transmitting the length of the line of sight vector to the first calculator 104. In this case, the first calculator 104 may be configured for comparing together the determined distance received from the distance calculator 108 and the received length of the line of sight vector and calculating the attenuation gain only when the distance received form the distance calculator 108 is less than or equal to the length of the line of sight vector.

For each line of sight vector, the first calculator 104 is configured for calculating the recirculation induced airflow velocity using the respective distance received from the distance calculator 108, as described above. The first calculator 104 is further configured for transmitting the calculated recirculation induced airflow velocity to the second calculator 106 which determines the actual airflow velocity at the rotor of the simulated helicopter using the initial airflow velocity and the recirculation induced airflow velocity, as described above.

In one embodiment, the distance calculator 108 is separate from the system 100. In this case, the distance calculator 108 may correspond to the simulation engine configured for generating the simulation of the helicopter.

In another embodiment, the distance calculator 108 is part of the system 100.

In one embodiment, each one of the modules 102-108 is provided with a respective processing unit such as a microprocessor, a respective memory and respective communication means. In another embodiment, at least two of the modules 102-108 may share a same processing unit, a same memory and/or same communication means. For example, the system 100 may comprise a single processing unit used by each module 102-106, a single memory and a single communication unit.

Figure 6:
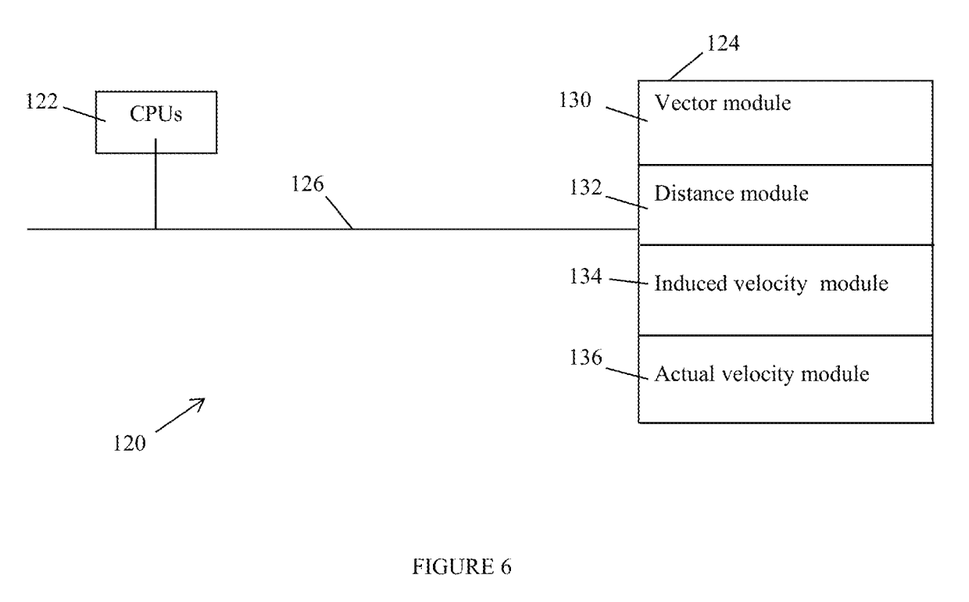
FIG. 6 is a block diagram of a processing module adapted to execute at least some of the steps of the method of FIG. 2, in accordance with an embodiment.

FIG. 6 is a block diagram illustrating an exemplary processing module 120 for executing the steps 32 to 40 of the method 30, in accordance with some embodiments. The processing module 120 typically includes one or more Computer Processing Units (CPUs) and/or Graphic Processing Units (GPUs) 122 for executing modules or programs and/or instructions stored in memory 124 and thereby performing processing operations, memory 124, and one or more communication buses 126 for interconnecting these components. The communication buses 126 optionally include circuitry (sometimes called a chipset) that interconnects and controls communications between system components. The memory 124 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 124 optionally includes one or more storage devices remotely located from the CPU(s) 122. The memory 124, or alternately the non-volatile memory device(s) within the memory 124, comprises a non-transitory computer readable storage medium. In some embodiments, the memory 124, or the computer readable storage medium of the memory 84 stores the following programs, modules, and data structures, or a subset thereof:

a vector module 130 for generating at least one line of sight vector;

a distance module 132 for calculating the distance between the source position of the line of sight vector and the closest obstacle along the direction of the line of sight vector;

an induced airflow velocity module 134 for calculating the recirculation induced airflow velocity at the rotor using the calculated distance; and an actual airflow velocity module 136 for calculating the actual airflow velocity at the rotor using the initial airflow velocity and the recirculation induced airflow velocity.

It should be understood that the distance module 132 and/or the actual airflow velocity module 136 may be omitted.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 84 may store a subset of the modules and data structures identified above. Furthermore, the memory 84 may store additional modules and data structures not described above.

Although it shows a processing module 120, FIG. 6 is intended more as functional description of the various features which may be present in a management module than as a structural schematic of the embodiments described herein. In practice, and as recognized by those of ordinary skill in the art, items shown separately could be combined and some items could be separated.

While the above-described methods and systems refer to a simulated helicopter, it should be understood that the above-described methods and systems may apply to any simulated rotorcraft such as a simulated cyclogyro, a simulated cyclocopter, a simulated autogyro, a simulated gyrodyne, a simulated rotor bike, or the like.

The embodiments of the invention described above are intended to be exemplary only. The scope of the invention is therefore intended to be limited solely by the scope of the appended claims.

We claim:

1. A computer-implemented method for determining an effect of a simulated obstacle on a main rotor induced velocity of a simulated rotorcraft in a simulation, comprising:
receiving an aircraft airspeed of the simulated rotorcraft and a height above ground for the simulated rotorcraft;
generating a line of sight vector having a source position located on the simulated rotorcraft, a direction and a given length;
determining a distance between the simulated obstacle and the simulated rotorcraft using the line of sight vector, the distance being at most equal to the given length of the line of sight vector;
determining a recirculation induced airflow velocity using the distance between the simulated obstacle and the simulated rotorcraft, the aircraft airspeed and the height above ground, the recirculation induced airflow velocity being caused by a downwash recirculation flow generated by the simulated obstacle; and
outputting the recirculation induced airflow velocity.

2. The computer-implemented method of claim 1, wherein the direction of the line of sight vector corresponds to an azimuth angle.

3. The computer-implemented method of claim 1, wherein the line of sight vector is parallel to an Earth horizontal plane.

4. The computer-implemented method of claim 3, wherein the source position is located at least one of along the rotation axis of the main rotor of the simulated rotorcraft and on a hub of the main rotor of the simulated rotorcraft.

5. The computer-implemented method of claim 1, further comprising varying at least one of an azimuth angle of the line of sight vector and a position of the source position along a rotation axis of the main rotor of the simulated rotorcraft.

6. The computer-implemented method of claim 1, wherein said generating the line of sight vector comprises generating a plurality of line of sight vectors each having a respective source position located on the simulated rotorcraft, a respective azimuth angle and a respective length.

7. The computer-implemented method of claim 6, wherein said determining the distance between the simulated obstacle and the simulated rotorcraft comprising determining a respective distance between each respective source position and the simulated obstacle.

8. The computer-implemented method of claim 6, wherein the respective length is identical for each one of the plurality of line of sight vectors.

9. The computer-implemented method of claim 1, wherein said determining the distance between the simulated obstacle and the simulated rotorcraft comprises:
accessing a visual database containing a topography of a simulated terrain and simulated physical structures;
identifying the simulated obstacle as being the closest object from the source position along a direction defined by an azimuth angle, the closest object being one of a part of the simulated terrain and one of the simulated physical structures and a distance between the closest object and the source position being at most equal to the given length of the line of sight vector; and
determining a distance between the source position and the closest object, thereby obtaining the distance between the simulated obstacle and the simulated rotorcraft.

10. A system for determining an effect of a simulated obstacle on a main rotor induced velocity of a simulated rotorcraft in a simulation, comprising:
a vector module configured for generating a line of sight vector having a source position located on the simulated rotorcraft, an azimuth angle and a given length;
a calculation module configured for:
receiving a distance between the simulated obstacle and the simulated rotorcraft, an aircraft airspeed of the simulated rotorcraft and a height above ground for the simulated rotorcraft;
determining a recirculation induced airflow velocity using the distance between the simulated obstacle and the simulated rotorcraft, the aircraft airspeed, the height above ground and the distance between the simulated obstacle and the simulated rotorcraft, the recirculation induced airflow velocity being caused by a downwash recirculation flow generated by the simulated obstacle and the distance being at most equal to the given length of the line of sight vector; and
outputting the recirculation induced airflow velocity.

11. The system of claim 10, wherein the direction of the line of sight vector corresponds to an azimuth angle.

12. The system of claim 10, further comprising a distance module configured for determining the distance between the simulated obstacle and the simulated rotorcraft using the line of sight vector.

13. The system of claim 10, wherein the line of sight vector is parallel to an Earth horizontal plane.

14. The system of claim 10, wherein the vector module is further configured for varying the azimuth angle of the line of sight vector.

15. The system of claim 10, wherein the vector module is further configured for varying a position of the source position along a rotation axis of the main rotor of the simulated rotorcraft.

16. The system of claim 10, wherein the vector module is configured for generating a plurality of line of sight vectors each having a respective source position located on the simulated rotorcraft, a respective azimuth angle and a respective length.

17. The system of claim 16, wherein the distance between the simulated obstacle and the simulated rotorcraft comprising a respective distance between each respective source position and the simulated obstacle.

18. The system of claim 16, wherein the respective length is identical for each one of the plurality of line of sight vectors.

19. The system of claim 10, further comprising a distance module configured for:
accessing a visual database containing a topography of a simulated terrain and simulated physical structures;
identifying the simulated obstacle as being the closest object from the source position along a direction defined by the azimuth angle, the closest object being one of a part of the simulated terrain and one of the simulated physical structures and a distance between the closest object and the source position being at most equal to the given length of the line of sight vector; and
determining a distance between the source position and the closest object, thereby obtaining the distance between the simulated obstacle and the simulated rotorcraft.

20. A non-transitory computer program product comprising a computer readable memory storing computer executable instructions thereon that when executed by a computer perform method steps of:
    receiving an aircraft airspeed of a simulated rotorcraft and a height above ground for the simulated rotorcraft;
    generating a line of sight vector having a source position located on the simulated rotorcraft, a direction and a given length;
    determining a distance between a simulated obstacle and the simulated rotorcraft using the line of sight vector, the distance being at most equal to the given length of the line of sight vector;
    determining a recirculation induced airflow velocity using the distance between the simulated obstacle and the simulated rotorcraft, the aircraft airspeed and the height above ground, the recirculation induced airflow velocity being caused by a downwash recirculation flow generated by the simulated obstacle; and
    outputting the recirculation induced airflow velocity.

* * * * *